United States Patent [19]

Welch et al.

[11] Patent Number: 5,319,363

[45] Date of Patent: Jun. 7, 1994

[54] NETWORK FOR PORTABLE PATIENT MONITORING DEVICES

[75] Inventors: James P. Welch, Beverly; Nathaniel M. Sims, Wellesley Hills, both of Mass.

[73] Assignee: The General Hospital Corporation, Boston, Mass.

[21] Appl. No.: 932,924

[22] Filed: Aug. 20, 1992

Related U.S. Application Data

[63] Continuation of Ser. No. 576,700, Aug. 31, 1990, abandoned.

[51] Int. Cl.$^5$ .............................................. H04Q 9/00
[52] U.S. Cl. ........................... 340/825.36; 340/825.17; 340/825.49
[58] Field of Search ...................... 340/825.36, 825.49, 340/825.17, 825.52, 286.13, 286.14, 286.07, 870.11, 525, 524; 364/413.02, 413.03; 370/85.1, 85.2, 85.3; 379/25

[56] References Cited

U.S. PATENT DOCUMENTS

| | | | |
|---|---|---|---|
| 4,051,522 | 9/1977 | Healeay et al. ...................... | 340/717 |
| 4,216,462 | 8/1980 | McGrath et al. ............... | 364/413.03 |
| 4,237,344 | 12/1980 | Moore .......................... | 340/286.07 |
| 4,356,475 | 10/1982 | Neumann et al. ................... | 340/525 |
| 4,674,085 | 6/1987 | Arangure et al. .................. | 370/85.2 |
| 4,887,260 | 12/1989 | Carden et al. ....................... | 340/525 |
| 4,916,444 | 5/1990 | King ............................... | 340/825.49 |
| 4,920,339 | 5/1990 | Friend et al. .................... | 340/825.52 |
| 5,038,800 | 8/1991 | Oba ..................................... | 128/904 |
| 5,061,916 | 10/1991 | French et al. ........................ | 340/525 |

OTHER PUBLICATIONS

H. Schillings, B. Scharnberg, Ruth M. Sabean, C. Th. Ehlers; A New Concept For Computer-Assisted Patient Monitoring: Gottingen Information System For Intensive Care GISI; pp. 173–176.

Hewlett Packard, HP Component Monitoring System Service Manual Functional Description Section, Edition 3, Jan. 1990: pp. iii to iv and 2-27 to 2-32 only.

Fisher Berkeley Corporation, MMC-2 Second Generation Computer Nurse Call, 1991.

Fisher Berkeley, MMC—A computer nurse call that is easy to use.

Primary Examiner—Donald J. Yusko
Assistant Examiner—Edwin C. Holloway, III
Attorney, Agent, or Firm—Fish & Richardson

[57] ABSTRACT

Multiple devices that are each suitable for use at a selected one of multiple locations are managed using a network of links that are each assigned to one of the locations. Each link is selectable between a state in which a device is not using the link and a state in which one or more devices are using the link. Links that are in use by the devices are identified and the locations at which the devices are used are determined based on the identities of the links that are in use.

52 Claims, 13 Drawing Sheets

NETWORK FOR PORTABLE PATIENT MONITORING DEVICES

This is a continuation of application Ser. No. 07/576,700, filed Aug. 31, 1990, now abandoned.

BACKGROUND OF THE INVENTION

This invention relates to interconnecting multiple patient care devices to a central location (such as a nurses' station) for observation and control.

A wide variety of patient care devices (PCDs) are currently available. Examples include vital signs monitors (which measure such parameters as ECG, non-invasive and invasive blood pressure, pulse oximetry, etc.), ventilators, and infusion pumps. PCDs typically are not permanently installed beside each bed in every hospital room in the general care areas of the hospital. One reason is, of course, the expense of such an arrangement, but another, equally practical reason is that patients who are cared for in these areas generally do not require routine use of PCDs.

Often, vital signs monitoring and use of infusion pumps are necessary temporarily, for example, for a few hours after the patient returns to the room from surgery. This is typically accomplished with portable PCDs brought to the patient's bedside. Thus, portable PCDs are used in general care areas on an ad hoc basis and it is common for a given PCD to be used in several rooms over the course of a few days. It therefore is difficult for a health care provider to determine the locations of the PCDs and of the patients who are using them, other than by physically looking in every room on the floor. Moreover, it is often helpful to a patient's recovery process to allow the patient to ambulate during the period that he or she is connected to the PCD; locating such a patient is usually done visually by searching the hallways.

General care patients that are using the PCDs are typically the most acute (i.e., medically unstable) patients on the floor (i.e., the patients that bear the closest monitoring by the floor's staff of health care providers). Concomitantly, the presence of a PCD at a bedside serves as a flag to indicate that the patient should be monitored carefully. But because the PCDs are located inside of the room, they often cannot be seen from the nurses' station, and alarms generated by the PCDs (for example, warning that the patient's cardiac functions have fallen outside of preset limits) may not be easily detected. Consequently, the patient sometimes is moved to another room that is closer to the nurses' station to reduce the possibility that alarms may go undetected.

An alternative is to move the patient to a specialized, advanced care unit, such as an intensive care unit (ICU) or "stepdown" unit for the short time that vital signs monitoring is needed. In the ICU, special purpose devices dedicated to, e.g., ECG monitoring, are permanently mounted in each patient's cubicle. The devices are connected via a private network (i.e., a network having a communication protocol not available for general purpose use) to special purpose displays located at the nurses' station so that all of the devices can be observed centrally. The displays typically can only display limited information (e.g., heart waveforms and heart rate) and are thus unsuitable for general purpose use. Moreover, the patients generally cannot ambulate throughout the unit while connected to the monitoring devices.

Ambulation is possible in stepdown units, which generally monitor, by RF medical telemetry, exclusively patients' electrocardiogram (ECG). ECG RF transmitters worn by the patients transmit ECG data to antennas connected to a central nurses' station for observation. The telemetry antenna is permanently mounted near the patients' rooms and hard-wired to the nurses' station.

SUMMARY OF THE INVENTION

A general aspect of the invention is managing multiple devices that are each suitable for use at a selected one of multiple locations using a network of links that are each assigned to one of the locations; each link is selectable between a state in which a device is not using the link and a state in which one or more devices are using the link. Links that are in use by the devices are identified and the locations at which the devices are used are determined based on the identities of the links that are in use.

The invention is advantageously employed to manage the use and operation of portable patient care devices (PCDs) and track the locations of the PCDs as they are used at various bedsides and by ambulating patients.

Preferred embodiments include the following features.

The devices send and receive messages to other devices on the network via the links. Each link is associated with a port of a multiport repeater (or terminal server), and the locations of the devices are determined based on the identities of the ports that are associated with links on which the messages appear. The messages sent by a particular device identify that device (e.g., by device type) so that a device's location is correlated with its identity (e.g., as a vital signs monitor, an infusion pump, a ventilator, etc.).

Some of the links comprise unterminated cable (such as coaxial or twisted pair wiring) ends of which are disposed at different locations. These links are considered unused unless and until they are terminated, at which time they are designated as being in use.

Termination may be established in many different ways. One simple technique is to manually connect a terminator to the cable at the time that the device is connected to the network. But preferably, the devices each include circuitry that, when the device is connected to the network, determines (such as by impedance testing) whether the cable is already terminated by another device, and circuitry for terminating the cable if it has not already been terminated. If the cable is already terminated (e.g., by a device that had previously been connected to the cable) but the termination is improper for the newly-added device, an impedance imbalance is placed on said cable; this causes the previously-connected device to remove the termination, thereby permitting the newly-added device to terminate the cable.

Other links are cellular in nature and adapted to communicate over a wireless transmission medium with cellular devices disposed in a predetermined area. Multiple transceivers are arranged on the link and each transceiver communicates with a device located in a regional cell within the area that is assigned to the transceiver. Each cellular device transmits messages that identify the device, and each transceiver relays messages received from a device located in the transceiver's cell and identifies itself as part of the relaying process. The cellular location of a device is determined based at least in part on the identity of the transceiver with which the device is communicating.

The identity of each device connected to the network at each location is tracked based on the messages that the devices transmit. A database for stores information that designates, for each device, the category thereof (e.g., whether it is a vital signs monitor, an infusion pump, or a ventilator).

The system also includes a processor (such as a workstation) located remotely from the locations of the devices (e.g., at a nurses' station) for communicating with the devices via the network links. The processor displays to a user information about the devices based on data received from the devices over the network. The display enables the user to visualize at a glance the locations of all devices that are in use on the network and the status of these devices. Several display formats are available to allow the user to view, for example, a hospital floor at various levels of detail.

For example, one format displays a floor map to the user; icons on the map indicate the locations of the devices currently in use on the network. The appearance of each icon (e.g., its color) designates the status of the corresponding device (such as whether it is functioning normally or is in an alarm condition).

Another display format allows the user to visualize virtual images of the front panels of numerous (e.g., up to eight) devices. This is an invaluable tool that permits the user to monitor the operation of the device from the workstation without having to travel to the physical location of the device.

In yet another format, the area around a particular location (e.g., a patient's bedside) is displayed to enable the user to rapidly identify the number and types of devices in use at that location, as well as the status of each device. If desired, the user can also monitor the virtual images of the front panels of the devices.

A sophisticated user interface allows the user (i.e., a health care provider) to control the operation of any device on the network. For example, alarm limits may be set or modified and alarm conditions may be disabled from the workstation without requiring the user to travel to the device. Devices are selected for control using any one of the display formats described above.

The system also includes multiple alarm annunciators disposed at various locations (e.g., throughout a hospital floor) for displaying messages that identify devices that enter an alarm condition and sounding alarm tones to warn health care providers of the existence of the alarm. The annunciators are also controlled (e.g., to silence the alarm tone) from the workstation via the user interface.

The invention provides a powerful but straightforward and inexpensive solution to the problem of centrally managing the use and control of portable patient care devices (PCDs). The PCDs are networked without the need to install a PCD at every bedside, enabling a hospital to stock relatively few PCDs for a large number of beds. Because all general care bedsides are available for connection to the network, there is no need to move the patient to the PCD for close monitoring. As a result, continuity of nursing care is maintained.

The invention also provides central monitoring of numerous vital functions and other patient care activities (e.g., ventilation). Patients are located easily through the utilization and implementation of standard, readily available network hardware and software and standard network management techniques. This further reduces the cost of the system and ensures compatibility with existing and emerging communications devices.

The PCDs are connected to and disconnected from the network without disrupting the operation of the network or the performance of other PCDs, a must in view of the ever-changing locations in which the PCDs are used.

Besides the numerous benefits to the quality of patient care, the invention also allows many administration functions involving the PCDs (e.g., inventory control, service calls, billing for PCD use) to be automated.

Other features and advantages will become apparent from the following description, and from the claims.

DESCRIPTION OF THE PREFERRED EMBODIMENTS

We first briefly describe the drawings.

STRUCTURE AND OPERATION

Figure 1:
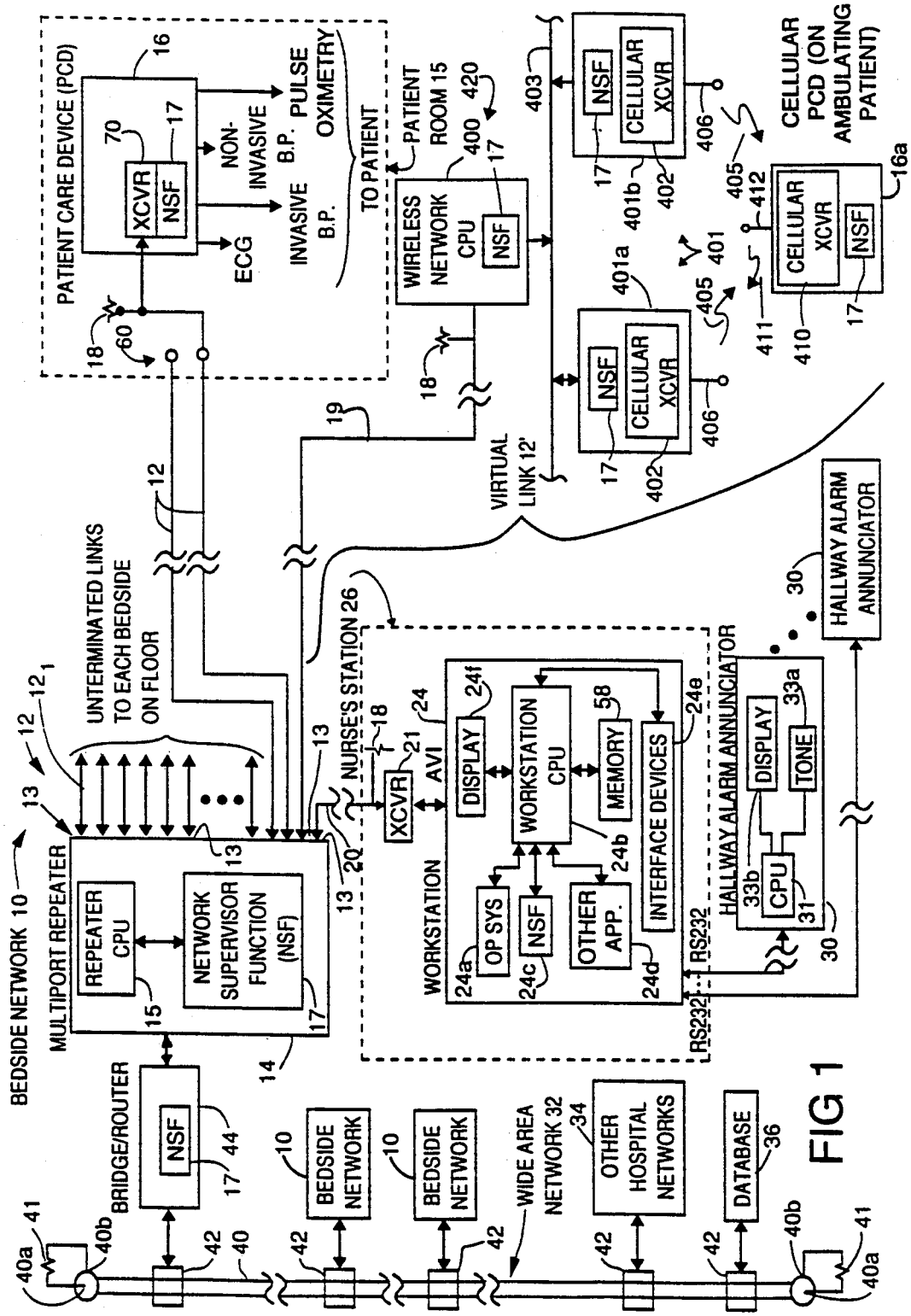
FIG. 1 is a block diagram that shows a network for portable patient care devices according to the invention.
Figure 2:
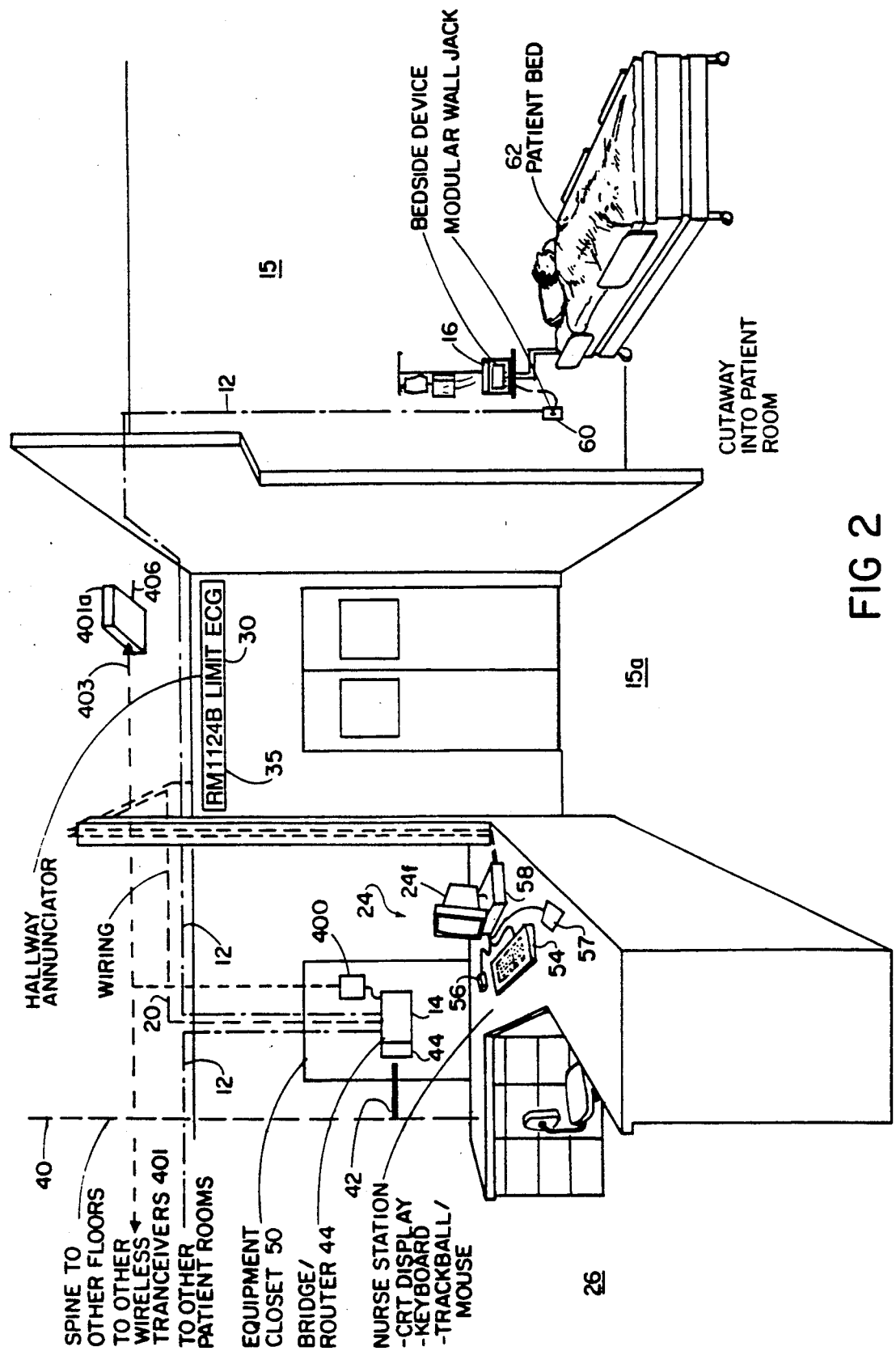
FIG. 2 is a partial, perspective diagram of an area of a hospital floor on which the network has been installed.

Referring to FIGS. 1 and 2, bedside network 10 includes links 12 that originate from respective ports 13 of a multiport repeater 14 and are wired to the vicinity of every bed (i.e., the bedside) in every patient room 15 on a floor of a hospital. Each floor in, for example, the general care areas of the hospital includes a bedside network 10. (Network 10 may extend over more than one floor if the floor includes a small number of beds; alternatively, large floors may require more than one network 10.) As described in detail below, because general care patients normally are not using patient care devices, links 12 each are normally unused (i.e., inactive). Each link 12 becomes active only when a patient care device (PCD) 16, 16a, such as an vital signs monitor (shown in FIG. 1), a ventilator, or an infusion pump is put into use on the link 12 in one of the ways described below. Links 12 that are wired into rooms 15 are unterminated when not in use. When a PCD 16 is used in a room 15, it is connected to a link 12 in such a way as to terminate 18 the link. PCDs 16 are portable so that they can be brought directly to the bedsides of any patient in need of them.

Multiport repeater 14 is an Ethernet/IEEE 802.3 repeater with uniquely addressable ports 13, such as an MMAC IRM (Intelligent Repeater Module) from Cabletron of Rochester, N.H. The operation of repeater 14 is managed by a repeater CPU (central processing unit) 15 which implements network supervisory functions (NSF) 17, including, for example, simple network management protocol (SNMP) capabilities; other suitable network management protocols may be used instead. One port 13 of multiport repeater 14 is connected via a cable 20 to a workstation 24 (i.e., a data processing device) located at a nurses' station 26 on the floor. Links 12 and cable 20 are 10-base-2 coaxial cable, but any suitable type of interconnection medium may be used instead. For example, links 12 and cable 20 can be twisted-pair (10-base-T) or fibre optic wiring (FDDI).

Another repeater port 13 is connected via cable 19 (e.g., a 10-base-2 coaxial cable) to RF wireless network CPU 400. CPU 400 also implements network supervisory functions (NSF) 17 and drives a wireless subnetwork 420 via cable 403, which provides a bus to which numerous wireless, cellular network transceivers 401 are connected (only two such transceivers, 401a and 401b, are shown). Cellular transceivers 401 each implement NSF 17 and are, e.g., mounted at various locations in common areas of the floor (such as hallways and waiting rooms). The operation of wireless subnetwork 420 is discussed in detail below. Suffice it here to say that subnetwork 420 provides virtual links 12' between repeater 14 and one or more cellular PCDs 16a in use by ambulating patients (e.g., who are walking in the hallways 15a (FIG. 2) of the floor).

At present, workstation 24 does not include a network transceiver (i.e., a media access unit or MAU) so cable 20 is connected via a separate transceiver 21 to the AUI (access unit interface) port of workstation 24. Workstation 24 is a computer (e.g., a Sun Microsystems SPARC) with a multitasking operating system 24a (such as Unix) that allows central processing unit (CPU) 24b to implement network supervisory functions 17 to support bedside network 10, while also allowing workstation 24 to be used to run other applications programs 24d to perform other tasks (such as compiling and reporting acuity levels, ordering laboratory tests, and viewing radiology reports, to name but a few). Workstation 24 also includes numerous user interfaces 24e (described below) and a high resolution, display 24f to facilitate the health care provider's use and operation of bedside network 10. Other workstations 24 (not shown) may be connected to bedside network 10 to facilitate clinical activities.

It will be appreciated that often a single nurses' station 26 serves several rooms 15 (which each include one or more patient beds), and that PCDs 16 located in various rooms 15 (or PCDs 16a located in the hallways of the floor) typically cannot be seen or alarms generated by the PCDs heard at the nurses' station. But as described in detail below, bedside network 10 allows the health care provider to both monitor the status of and control the operation of any PCD 16, 16a on network 10 via workstation 24.

Bedside network 10 also includes multiple alarm annunciators 30 connected to the RS232 ports of workstation 24 and mounted remotely from the nurses' station 26, such as at selected hallway locations throughout the floor. As described in detail below, when workstation 24 receives a message from a PCD 16, 16a that indicates that the PCD is in an alarm condition, workstation 24 (besides displaying an indication of the alarm on display 24f as described in detail below) sends an alarm message to annunciators 30. The CPU 31 in each annunciator 30 responds to the alarm message by causing a tone generator 33a to sound an alarm and causing display 33b (a rectangular array of LEDs) to illuminate a message 35 (FIG. 2) that identifies the bed at which the alarming PCD is located and the type of alarm. For example, if the heart rate of the patient in bed B of room 1124 falls outside of preset limits, annunciators 30 display the message "RM 1124B LIMIT ECG". CPUs 31 prioritize alarm messages from workstation 24 by their type so that messages 35 for simultaneously existing alarms are displayed in order of their seriousness or their occurrence.

As a result, a health care provider can listen and watch for alarms from annunciators 30 while performing tasks that take him or her away from nurses' station 26. Annunciators 30 are placed strategically throughout the floor (e.g., on the wall above doorways, suspended from the ceiling at hallway intersections) so that a health care provider can observe (and hear) at least one annunciator from nearly any location on the floor.

Bedside network 10 is a local area network (LAN) that conforms to Ethernet and IEEE Standard 802.3 and forms part of a wide area network (WAN) 32 in the hospital. WAN 32 includes other bedside networks 10 and other types of networks 34, for example, a hospital-wide information network that allow patient data stored in a shared database 36 to be accessed throughout the hospital. All of the networks 10, 34 are connected via standard taps 42 to a common link 40 (called a "spine") that runs throughout the hospital. Spine 40 is a 10-base-5 coaxial cable, but any other suitable transmission medium can alternatively be used. Each end of spine 40 is terminated 41 (by connecting a 50 ohm impedance device between the center conductor 40a and the shield 40b of spine 40) to minimize signal reflections and provide a suitable transmission medium for messages sent over spine 40.

A bridge/router 44 is connected between tap 42 and multiport repeater 14 in bedside network 10 to control the transmission of messages between network 10 and other networks via spine 40. Like the other Ethernet devices on network 10, bridge/router 44 implements network supervisory functions 17.

FIG. 2 shows the physical arrangement of a portion of bedside network 10 on a hospital floor. Multiport repeater 14 and bridge/router 44 are mounted in an equipment closet 50 for connection to spine 40. Most of the links 12 are wired on a point-to-point basis to individual bedsides in rooms 15. Rooms with multiple beds receive one link 12 for each bed (a private room 15 is shown in FIG. 2). The end of each link 12 is made available for connection to a PCD 16 via a modular wall jack 60 located near the patient's bed 62.

As discussed, cable 19 is connected to wireless network CPU 400, which is in turn connected by subnetwork link 403 to multiple wireless transceivers 401. FIG. 2 shows one of the transceivers 401a mounted in the ceiling of the hallway near nurses' station 26.

Display screen 24f of workstation 24 enables the user (i.e., the health care provider) to visualize at a glance the locations of all bedsides at which PCDs 16 have been connected on network 10 and all cellular PCDs 16a being used by ambulating patients via conspicuous, readily identifiable icons. As discussed below with reference to FIGS. 4-6 (which show two types of displays and several icons generated on screen 24f), the icons also indicate the status of all such PCDs 16, 16a (e.g., whether a patient's vital signs are within or outside of limits), thereby enabling the user to rapidly locate every patient being monitored by a PCD 16, 16a on network 10 and determining the patient's condition simply by glancing at screen 24f.

Network 10 and workstation 24 also enable the user to control the operation of every PCD 16, 16a in use on bedside network 10 remotely from workstation 24, without the need for the user to travel to the patient's bedside. This capability is facilitated by making screen 24f an interactive device (i.e., a touchscreen). Other interface devices 24e such as a keyboard 54, "mouse" 56, and tablet 57 provide a comprehensive, easy to operate user interface for control of PCDs 16, 16a and for data entry. Additional data entry devices (e.g., trackballs, magnetic card readers, and bar code readers, not shown) may be used as well. Data sent by PCDs 16, 16a to workstation 24 over network 10 is stored in disk drive memory 58 or sent to database 36 for storage. The data can also be stored on other media, such as an optical disk or magnetic tape.

Figure 3:
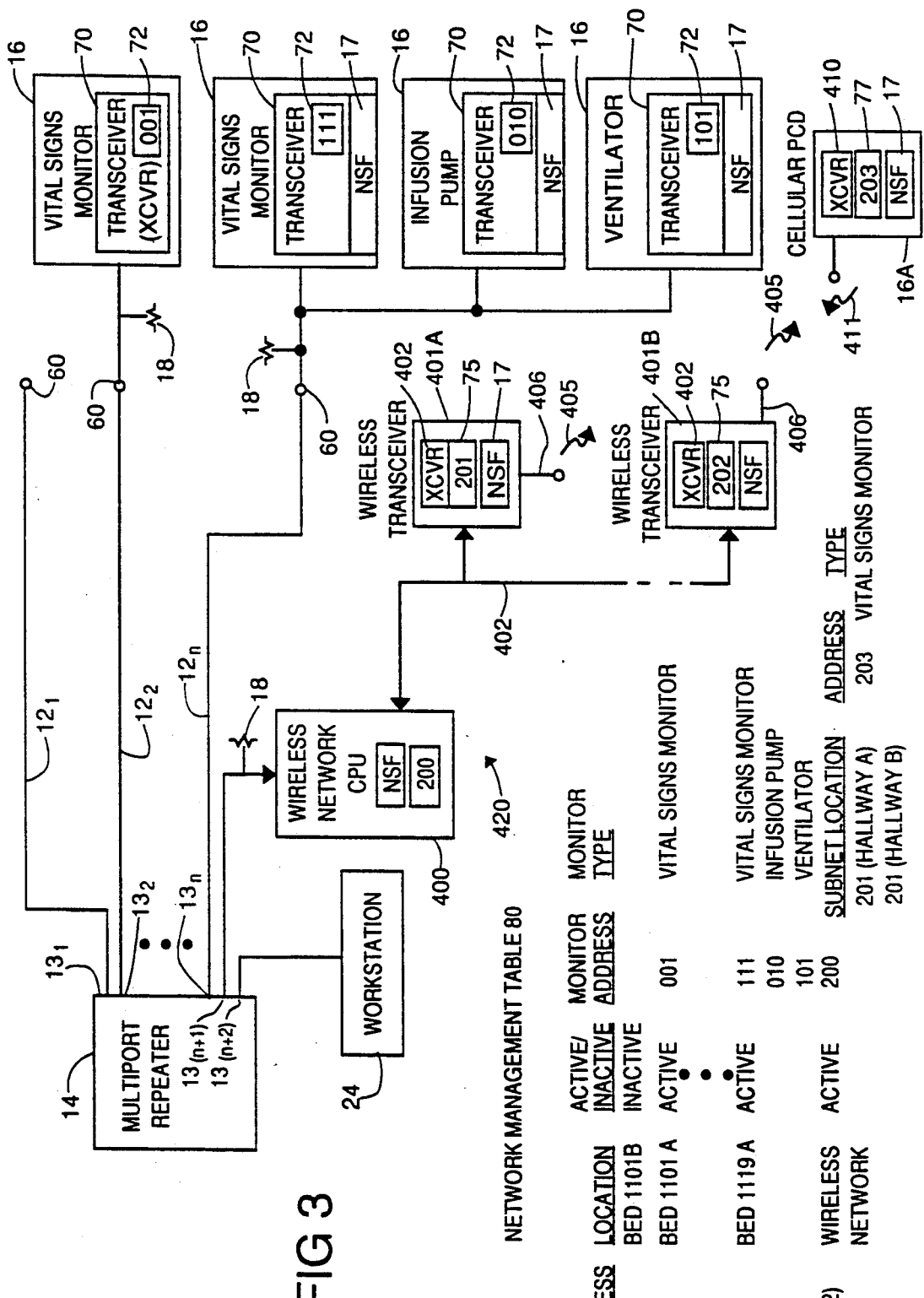
FIG. 3 is a block diagram and table useful in understanding the operation of the invention.

Referring also to FIG. 3, each port 13 of multiport repeater 14 is assigned a unique address $13_1$-$13_{n+2}$. Ports 13 with addresses $13_1$-$13_n$ (e.g., 36 ports) are connected by links 12 to bedsides 62, port address $13_{(n+1)}$ is assigned to wireless network CPU 400, and port address $13_{(n+2)}$ is assigned to workstation 24. Consequently, port addresses $13_1$-$13_n$ uniquely identify every bed 62 serviced by network 10, while port address $13_{(n+1)}$ designates the wireless subnetwork and port address $13_{(n+2)}$ identifies workstation 24. (Alternatively, one or more port addresses $13_1$-$13_n$ may be connected by a link 12 to a room in which PCDs are stored when not in use; connection of the PCDs to such link in the storage room allows the PCDs to be inventoried via network 10.) During operation of multiport repeater 14, repeater CPU 15 and NSF 17 monitor ports 13 to determine whether each is in use. This information is available to workstation 24. As shown schematically in FIG. 1, the repeater ports 13 connected to workstation 24 and wireless network CPU 400 are always terminated 18.

Every PCD 16 that is constructed to operate over an Ethernet and IEEE 802.3 network includes a transceiver 70 that is programmed upon manufacture with a unique network (i.e., Ethernet) address 72. Likewise, wireless network CPU 400 is programmed with a unique network address 73, cellular transceivers 401 are each programmed with a unique network address 75, and each cellular PCD 16a is programmed with a unique network address 77. This provides a simple, straightforward mechanism by which workstation 24 (or database 36) can identify, not only the addresses $13_1$-$13_{(n+2)}$ of the ports 13 and the cellular transceivers 401 that are that are in use (and hence the locations of the PCDs 16 and PCDs 16a), but also the types (e.g., vital signs monitors, ventilators, and infusion pumps) and serial numbers of PCDs 16, 16a that are using network 10. One benefit of this capability is central, hospital-wide WAN automated control of numerous administrative functions concerning the PCDs (e.g., inventory control, service calls, and billing for PCD use).

In operation, one of the network management tasks of workstation 24 takes advantage of the ability of multiport repeater 14 to determine whether each port 13 is connected to a link 12 that is active (i.e., in use by a PCD) or inactive (i.e., unused). For each link 12 that is wired into a patient's room 15, this determination is made by detecting whether the link 12 is terminated 18. Links 12 that are unterminated (e.g., link 12 connected to port address $13_1$) are determined to be "inactive" or idle. A link 12 wired to a room 15 remains inactive unless and until a PCD 16 is connected to the link's wall jack 60 in such a way as to provide termination 18 for the link. For the sake of clarity, terminations 18 are shown schematically in FIGS. 1 and 3; several alternative physical arrangements for providing the terminations are discussed below. Repeater 14 detects that the termination has been made and then designates the link as "active". This is an often used network management technique to identify and shut down normally-terminated links that, because of a fault, become unterminated.

That is, in a typical network, the links are always terminated, and devices are connected to and disconnected from a link via taps that do not disturb the terminated condition of the link, much like the way in which bridge/router 44 is connected to spine 40. The invention takes advantage of the existing network management capabilities to identify an unterminated link (e.g., link $12_1$) using the unique address of the repeater port (e.g., port $13_1$) to which the link is connected, and thereby determine which bedsides have not been connected to a PCD 16 (and hence, by exclusion, which bedsides are so connected). This capability is particularly important because the topology of network 10— that is, the status and identities of the ports 13 that are terminated with PCDs 16—changes constantly as the portable PCDs 16 are brought to the bedsides where they are needed.

A wireless cellular transceiver 402 in each transceiver 401 transmits RF signals 405 and receives RF signals 411 via antenna 406 from a small, localized "cell" (e.g., having a 100 foot radius) to provide a wireless virtual link 12' to any cellular PCD 16a that comes within its cell (as would occur, for example, when an ambulating patient wearing a cellular PCD 16a enters the cell).

Cellular PCDs 16a (only one of which is shown in FIGS. 1 and 3) each implement NSF 17 and include a cellular transceiver 410 that transmits RF signals 411 and receives signals 405 via antenna 412. Signals 411 include, among other information, the unique address 77 that identifies the PCD 16a. The cellular transceiver 401 that receives signals 411 adds its network address 75 and forwards the signals to repeater 14 via cable 403, wireless CPU 400, and cable 20. Thus, workstation 24 can identify the status and approximate location (to an accuracy defined by the area of each cell) of any cellular PCD 16a that is in active communication with a network transceiver 401 by identifying the network address 75 of the network transceiver 401 that is currently receiving signals 411 from that PCD 16a.

The network control embodied in the workstation supervisory software 24c and the network supervisory functions 17 implemented in repeater 14 and in each PCD 16, 16a manages the information regarding the presence or absence of every device in use on network 10, the data path (i.e. hard wired link 12 or virtual link 12') being used by each device, and the operational characteristics of each such device. The basic function of multiport repeater 14 is to repackage messages received at an active port address $13_1$-$13_{(n+2)}$ and globally resend them from every other active port address $13_1$-$13_{(n+2)}$ for receipt by a device (e.g., a PCD 16, 16a or workstation 24) linked thereto by the network. In addition, the unique address $13_1-13_{(n+2)}$ of each port identifies the origination of packets transmitted on its link 12.

Each message is arranged as a packet that includes the source address of the message (e.g., the unique network address 72 of a PCD 16 or the unique address 77 of a PCD 16a), the destination address of the message (e.g., the network address of workstation 24), and data. In addition, repeater 14 inserts into the packet a specific identification stamp that identifies the address of the port 13 which received the packet from link 12. Other devices (such as other PCDs 16, 16a) that receive the message after it is retransmitted by repeater 14 simply ignore it unless their network addresses match the message's destination address. Thus, messages sent by a PCD 16, 16a to workstation 24 are accepted by workstation 24 and ignored by the other PCDs on the network, and messages sent by workstation 24 to a given PCD 16, 16a are accepted by that PCD only. Database 36 (or workstation memory 58) stores, among other information, records that associate each network address 72, 75, 77 with a PCD type (e.g., vital signs monitor, ventilator, infusion pump, etc.) and serial number, thereby enabling workstation 24 to identify the type of PCD from which an incoming message originated simply by inspecting the database records.

Workstation 24 constructs a management table 80 by which it keeps track of the active/inactive status of all of the ports 13 and their corresponding locations on the network, the network address of each PCD connected to an active port, and the identity of each such PCD. Thus, a user at workstation 24 can easily determine the locations of the bedsides at which PCDs 16 are in use, the cells in which wireless PCDs 16a are being used, and the identity of each type of monitor being used at each such bedside and in each such cell. For example, the user can quickly determine that the patient in bed 1101A (the bed that corresponds to port address 13b) is using a vital signs monitor, while the patient in bed 1119A (port address 13n) is using a vital signs monitor, an infusion pump, and a ventilator. By accessing admitting or patient census records (via hospitalwide information network 34), or by entering patient identification information, the user can link patient names with PCDs 16 at specific bed locations. Additionally, table 80 shows that wireless subnetwork 420 is active and is currently communicating with a vital signs monitor 16a located within the cell of transceiver 401b (which is located in "hallway B" of the floor).

Moreover, because network 10 (and hence the data in table 80) is accessible via WAN 32 from other computers in the hospital, the utilization of PCDs 16, 16a can be observed and managed on a hospital-wide basis. Among other advantages, this provides efficient allocation of hospital resources. It also enables rapid determination of the locations of all patients in a particular classification (e.g., all patients that are connected to vital signs monitors). Security codes can be employed to prevent unauthorized inquirers from obtaining sensitive information about the patients to ensure patient privacy. For example, the cardiac department may be given an access code that enables them to determine (via an inquiry made on the hospital-wide information network 34) the locations of all patients whose electrocardiogram activity is being monitored with a vital signs monitor PCD, but prevents them from obtaining the cardiac data generated by the PCDs; admitting physicians may be given an access code that enables them to obtain such cardiac data, but only for their own patients.

Workstation 24 generates numerous displays on screen 24f that allow the user to visualize at a glance the locations of the bedsides that are equipped with PCDs 16, the locations of cellular PCDs 16a on the floor, and the status of the PCDs 16, 16a being used (e.g., whether the PCDs are in an alarm condition). The user also interacts with PCDs 16, 16a from the workstation (e.g., to control their operation and to change alarm limits, etc.).

Figure 4:
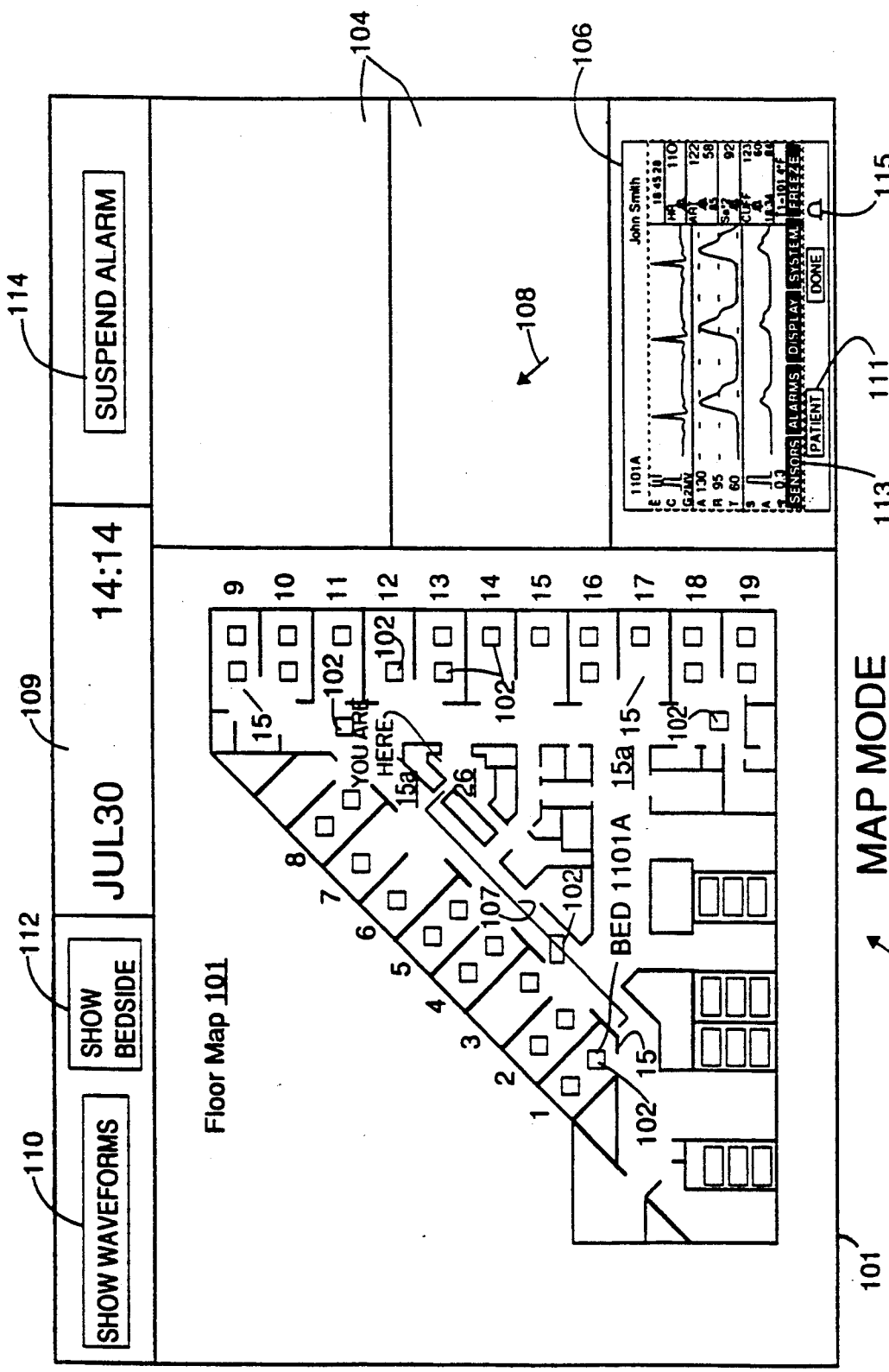
FIGS. 4-6 are examples of numerous displays generated during the operation of the network.
Figure 5:
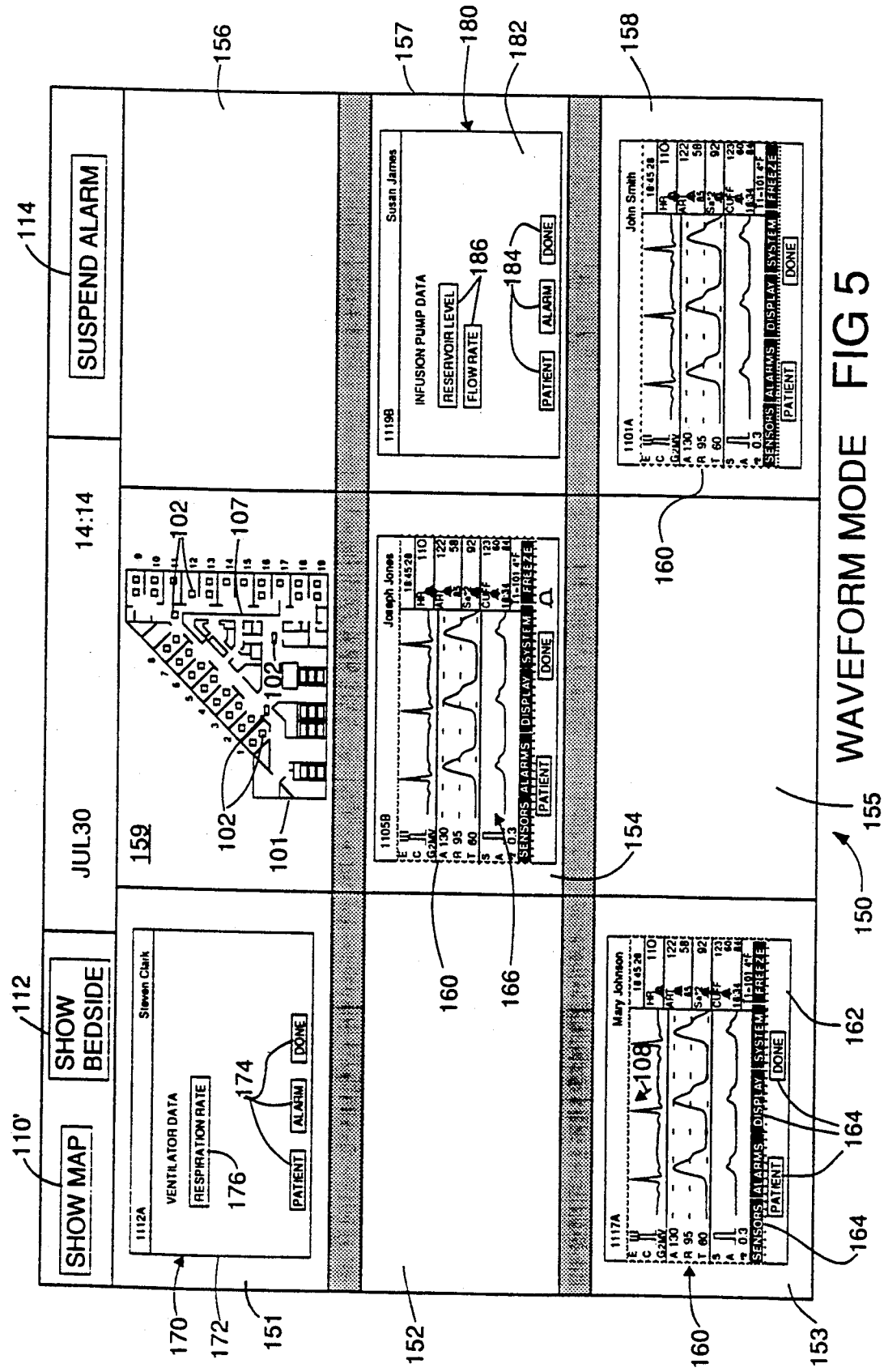
Figure 6:
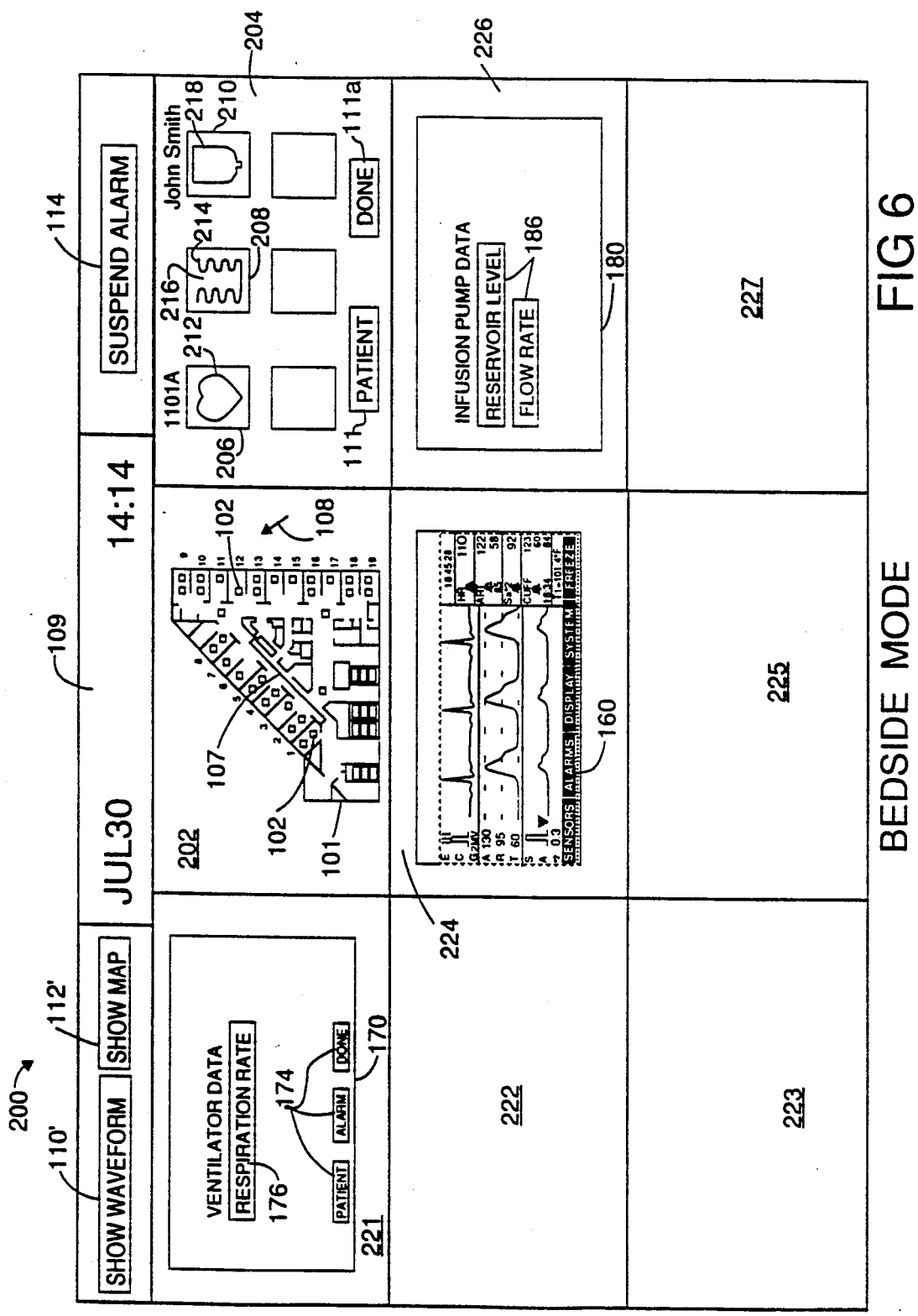

Referring to FIGS. 4-6, the user may select several different such displays, only three of which are shown in the figures. In the "map" display mode 100 shown in FIG. 4, a floor plan 101 is displayed which shows each room 15 on the floor as well as the hallways 15a and other common areas on the floor. Floor plan 101 also includes one or more icons 102 in each room and in the hallways and common areas to designate the bed or beds in the room, indicate the beds that are equipped with PCDs 16 connected to network 10, and show the approximate locations of active cellular PCDs 16a. The "waveform" display mode 150 shown in FIG. 5 permits the user to visualize in real time up to eight virtual images of front panels of PCDs 16, 16a being used on network 10. A third, "bedside" display mode (shown in FIG. 6) shows the user a virtual image of a selected bedside and displays icons that identify one or more PCDs 16 connected to network 10 at the bedside and indicate the status of each PCD. Up to seven virtual images of PCD front panels can also be displayed for that patient.

Referring to the map display mode 100 in detail, display 100 also includes a workspace 104 that enables the user to display a virtual image 106 of the front panel of a PCD 16, 16a (image 106 is of the front panel of a vital signs monitor manufactured by Protocol Systems, Inc. and is described in detail below). The user chooses which PCD virtual image 106 to display by selecting the icon 102 that represents the location of the bedside PCD 16, 16a of interest. This is done by moving pointer 108 to the icon 102 with mouse 56 and "clicking" the mouse. Workspace 104 has room for other windows (not shown) to enable the user to, e.g., enter patient data, set PCD operating parameters (discussed below), and perform other tasks without exiting the network application of workstation 24.

A header on display 100 includes buttons 110, 112 that enable the user to quickly select the "waveform" display mode or the "bedside" display mode by clicking on the respective buttons using mouse 56. The user is also permitted to suspend the alarm tone generated by annunciators 30 (but not the message displayed by the annunciators) by clicking on the "suspend alarm" button 114. (This technique can also be used to silence the local alarms produced by the PCDs.) When the alarm tone is disabled in this way, the label of button 114 changes to "resume alarm" to indicate that action is required from the user to permit the alarm tone to again be generated. After a time-out period with no action from the user, the alarm tone is reenabled and the label of button 114 changes back to "suspend alarm." The header also includes an area 109 that duplicates the current message being displayed by alarm annunciators 30. In the absence of an alarm, annunciators 30 display the date and time, as shown in FIG. 4; when an alarm tone is suspended as described above, the message displayed by the annunciators (and duplicated in area 109 includes the bed number of the alarm and the message "SYS SUSP" to indicate that the alarm tone has been disabled.

Other means of suspending the alarm tone, which do not require the health care provider to be at the workstation may be used as well. For example, a set of physical keys or buttons may be arranged at numerous locations throughout the floor, or the health care provider may carry an infrared emitter. These devices are linked to the workstation so that, when actuated, they cause the alarm tone to be disabled.

Figure 7A:
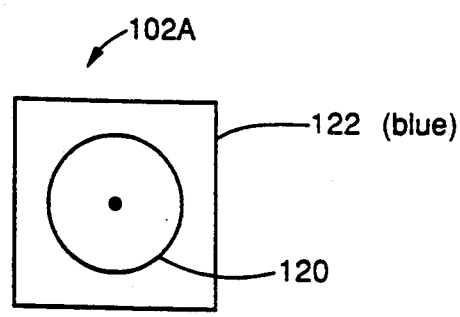
FIGS. 7A-7E show several of the icons used in the displays of FIGS. 4-6.

Referring also to FIGS. 7A–7E, the appearance of each icon 102 (e.g., its color) is a function of the presence or absence of a PCD at the bed that the icon represents and the status of the PCD (e.g., whether the identity of the patient who is using the PCD has been confirmed, whether the user has set the PCD's alarm limits and whether the PCD is operating within the limits or is in an alarm condition). FIG. 7A shows an icon 102a for an "inactive" bedside, that is, a bed at which a PCD is not connected to a network link 12 (or, alternatively, connected to link 12 but not turned on). Icon 102a includes a connector 120 within a blue colored square 122. (Alternatively, the display of icons for inactive bedsides can be suppressed to reduce the number of icons presented to the user.)

Figure 7B:
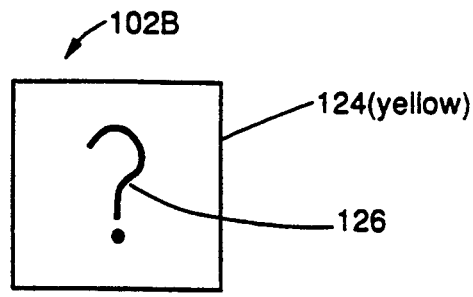
Figure 7C:
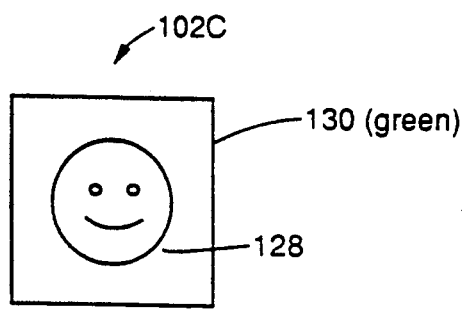

When a PCD 16 is connected to the wall jack 60 assigned to the bed (and turned on), the network link 12 is terminated, and the transceiver card 70 in the PCD has identified itself to workstation 24, icon 102a is replaced with icon 102b (FIG. 7B). Icon 102b also appears when a newly-used cellular PCD 16a is detected by transceiver 401. Icon 102b includes a yellow square 124 (e.g., in place of blue square 122), and a question mark 126 appears inside of square 124. This cues the user that more information about this connection to network 10 is needed. For example, the identity of the patient in the bed may need to be entered (if it has not already been supplied) or confirmed. In addition, the user needs to ensure that the operational "alarm limits" of PCD 16, 16a have been set.

For example, assume that a PCD 16 has just been connected to network 10 at bedside 1101A (labeled in FIG. 4). The user "clicks" on the icon 102b representing bed 1101A with pointer 108 and moves the pointer to workspace 104. This causes a virtual image 106 of the front panel of the PCD (e.g., a vital signs monitor) to appear. Note that whenever a PCD virtual image 106 is displayed, a path line 107 is displayed that connects nurses station 26 with the room in which the PCD 16, 16a is located. This feature enables the user to associate image 106 with a real location on the floor. The user enters the necessary patient information by using mouse 56 (FIG. 2) to select the "patient" button 111 on image 106. This causes a window (not shown) to appear in front of image 106 with spaces for entry of the patient data such as name, room number, and admitting physician via keyboard 54 or with other devices such as magnetic card or bar code readers (not shown). When all of the information has been entered, the user clicks on an icon in the window to redisplay image 106.

Figure 8:
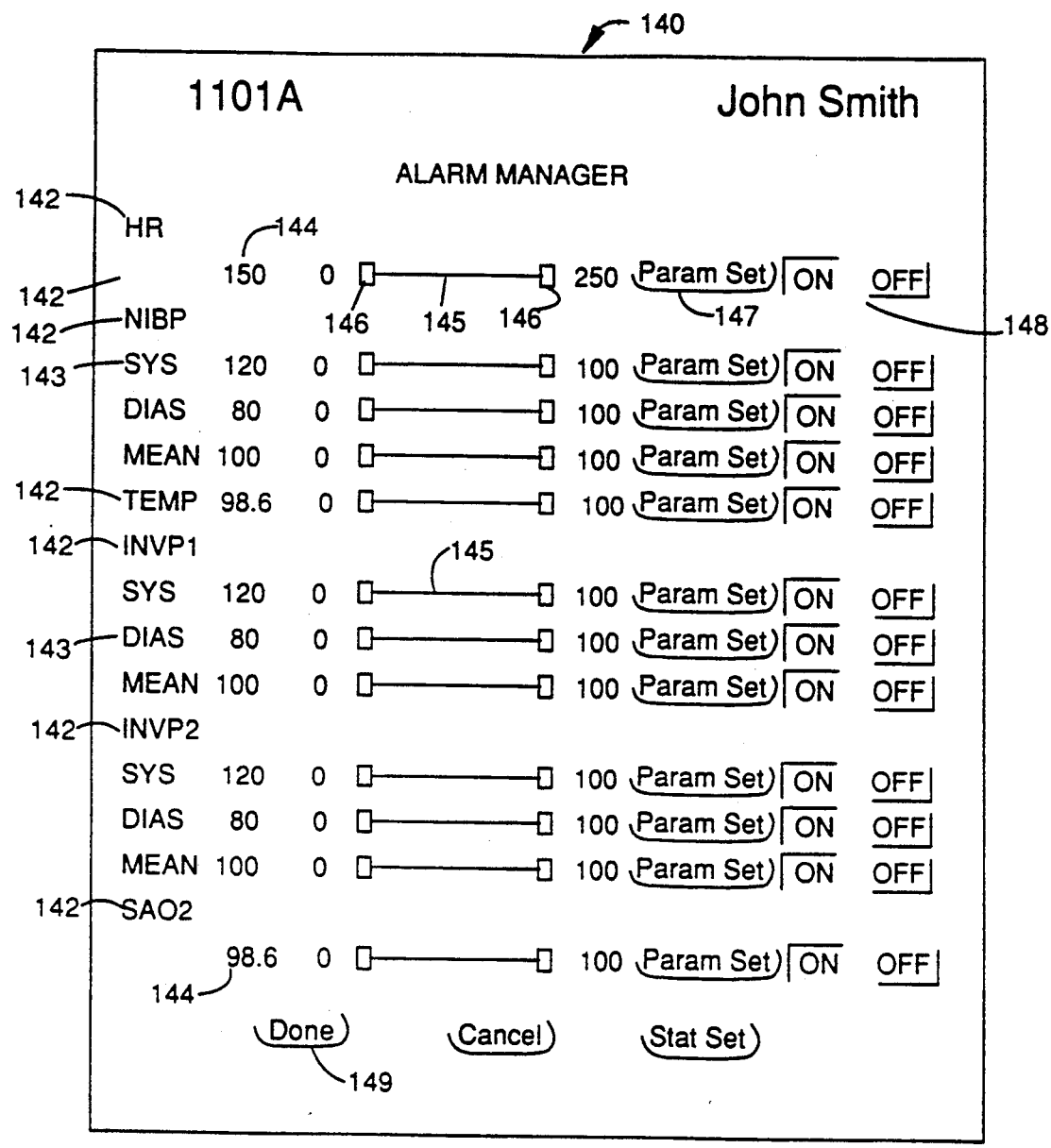
FIG. 8 is an example of a working window used in the displays of FIGS. 4-6 that enables the user to enter information.

Referring also to FIG. 8, the entry of a PCD's operational limits (such as its alarm limits) is also menu driven. The user clicks on the "alarms" button 113 (FIG. 4) on the image 106 of the PCD of interest, causing workstation 24 to display an alarm manager window 140 in work area 104. Alarm manager 104 identifies the types of functions 142 being monitored by the PCD, such as heart rate (HR), noninvasive blood pressure (NIBP), temperature (TEMP), invasive blood pressures (INVP1 and INVP2), and pulse oximetry (SA02). For each function 142, one or more parameters 143 are also listed next to the current reading 144 for each parameter. The image of a sliding bar 145 with a knob 146 is provided for each parameter that enables the user to set the upper and lower limits for each parameter.

The limits are set by clicking on the "parameter set" button 147 adjacent to the bar. This causes the corresponding image of an "on" button 148 to appear depressed and the alarm limits to be automatically set around the current physiological condition of the patient. The limits are changed by clicking on the knob 146 and sliding it to the left or right; releasing the button on the mouse sets the limit corresponding to the position of the knob 146. Additional alarm parameters may be set or modified as necessary in the same manner. When all alarm limits have been set as desired, the user returns to the active map display 100 by clicking on "done" button 149.

When workstation 24 determines that the patient's identity has been entered, the operational limits of PCD 16, 16a have been set, and that information from the PCD is being correctly received over the network and is within the limits set by the user, it changes yellow icon 102b to green icon 102c (FIG. 7C), thereby indicating that all is well at the location of the PCD. Icon 102c consists of a character 128 (such as a smiling face) within a green colored square 130.

Figure 7D:
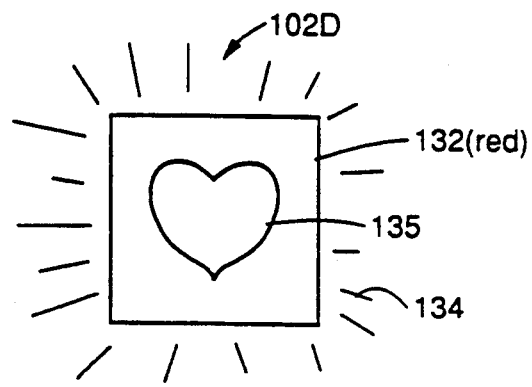

Occasionally, the information reported by a PCD 16, 16a to workstation 24 falls outside of the limits set by the user or the PCD reports the occurrence of a fault. This can happen in many ways. For example, the heart rate detected by a vital signs monitor may become irregular, too low or too high; an infusion pump might exhaust its fluid reservoir or detect a downstream occlusion; or the patient's airway pressure as detected by a ventilator may fall outside safe limits. When workstation 24 detects such an event, it changes the icon 102 that corresponds to the patient's bed or cellular location of the PCD to alarm icon 102d (FIG. 7D). Alarm icon 102d is a red square 132 that flashes 134 (e.g., once per second) to warn the user of the existence of an alarm. Red square 132 contains a character 135 (such as a heart) that indicates the type of alarm.

In addition, the virtual image 106 of the front panel of the alarmed PCD 16, 16a is automatically displayed in workspace 104 (FIG. 4). Thus, the user in nurses' station 26 is immediately notified of the alarm condition (even if the patient is in a remote room on the floor) and can observe the status of the alarmed PCD and, if necessary, control the PCD from his or her position at workstation 24. Workstation 24 also sends a message to hallway annunciators 30 (FIG. 1), causing them to sound an alarm and display a message identifying the bed at which the alarm is occurring and the type of alarm. The effect is to convert an alarm generated locally by a PCD (which emits an alarm tone that may not be heard, e.g., outside of the immediate vicinity of the patient's room) into a global alarm that can be seen and heard practically anywhere on the floor. In noise-sensitive areas of the hospital, or at certain times of day (e.g. night) when audible annunciation is offensive, other means of drawing attention to the presence of an alarm condition may be used as well. For example, workstation 24 may be equipped (e.g., with a modem or a transmitting antenna) to activate a standard alphanumeric display-equipped "pocket pager" (e.g., a "beeper") device (such as is available from Motorola) which has a silent ("vibrate") mode. Thus, a pager-equipped health care provider can be notified silently of alarm conditions, and of the nature and location of the alarms, even when out of visual range of hallway annunciators (e.g., in patient's room).

Some alarm conditions (such as minor variations in vital signs) are not sufficiently serious to warrant immediate action, either to treat the patient or reset the alarm limits so that they are no longer exceeded. In addition, a provider or patient may knowingly anticipate engaging in activity (e.g., replacing or adjusting patient sensors or probes such as electrocardiogram electrodes or pulse oximeter sensors, or vigorous ambulation or chest physical therapy) which by virtue of disturbing patient sensors would cause alarm conditions due to artifact. In such cases, alarms for that patient are suspended in advance, thus minimizing unnecessary alarm conditions and signifying the transfer of responsibility for surveillance of patient status, and for surveillance of PCD's, from the workstation to a human health care provider. When this occurs, the user can override alarm icon 102d and the alarm tone generated by annunciators 30. This is done by clicking on an alarm button 113 displayed in the virtual image 106 (FIG. 4) of the alarmed PCD, which causes buttons (not shown) for the functions being monitored by the PCD to be displayed and enables the user to select one or more alarms to be suspended by clicking on a "suspend" button (also not shown).

Figure 7E:
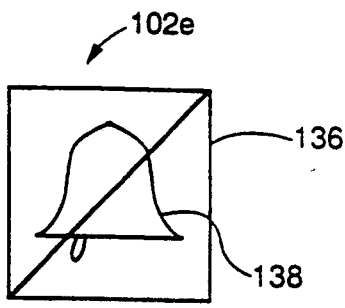

An overridden or disabled alarm icon changes to icon 102e FIG. 7E), a yellow square 136 enclosing character 138 that signifies that the alarm has been overridden (e.g., character 136 is an alarm bell with diagonal line running through it).

Referring to FIG. 5, in the "waveform" display mode 150, workstation 24 displays a set of windows 151–158 that can contain the virtual images of the front panels of up to eight PCDs 16 connected on network 10. A ninth window 159 displays a smaller scale version of floor plan 101, including the colored icons 102 (FIGS. 4 and 7). A header includes buttons 110' and 112 that allow the user to quickly select the other modes of display using mouse 56. The current alarm annunciator message is displayed in area 109, and button 114 is available for suspending annunciated alarm tones in the same manner as described above.

Of course, there may be many more than eight PCDs 16, 16a connected to network 10 at any one time. The user selects which PCD front panel images to display by moving pointer 108 to the icon 102 of interest on map 101, holding down the mouse button, moving pointer 108 to an empty window 151–158, and then releasing t he button. This has the visual effect of "dragging" the icon 102 to the window. Pointer 108 is shown in window 153. Whenever pointer 108 is positioned in a window 151–158 that is occupied by an image, path line 107 appears on map 101.

In FIG. 5, front panel images 160 of three vital signs monitors connected to network 10 at beds 1117A, 1105B, and 1101A are shown in windows 153, 154, and 158. The front panel image 170 of a ventilator connected to network 10 at bed 1112A is displayed in window 151. The front panel image 180 of an infusion pump connected to network 10 at bed 1119B is displayed in window 157. Each type of image 160, 170, 180 respectively includes an outline 162, 172, 182 of the image, buttons 164, 174, 184, used to control the PCDs, and data 166, 176, 186, from the PCDs. Workstation 24 determines which type of outline 162, 172, 182 to display by pairing the network address 72 that each PCD 16, 16a transmits with data about the PCDs stored in database 36 (or workstation memory 58). The arrangement of images 160, 170, 180, including the labels of buttons 164, 174, 184 and the appearance of data 166, 176, 186 replicates those that are present on the actual front panels of the PCDs (i.e., images 160, 170, 180 are virtual images of the front panel).

Figure 9:
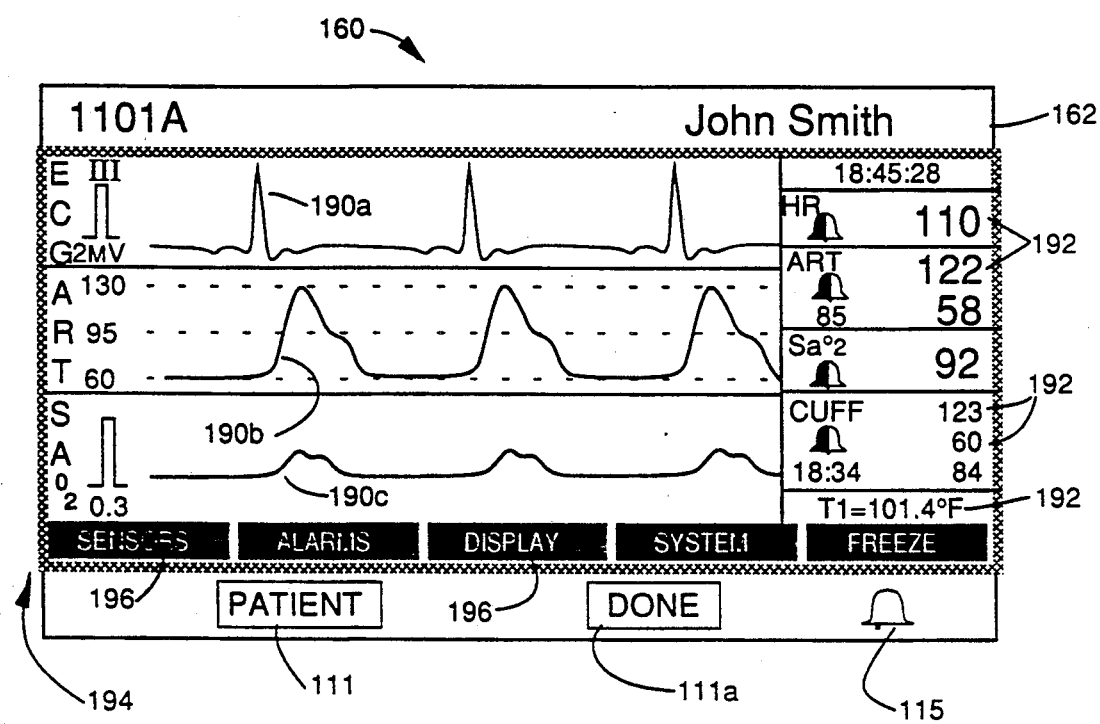
FIG. 9 shows an image of a front panel of a patient care device included in the displays of FIGS. 4-6.

Referring also to FIG. 9, image 160 for the vital signs monitor PCD 16 located at bed 1101A is shown in detail. Image 160 includes a header that identifies the bed number and the patient name (i.e., John Smith), and a footer that includes "patient" button 111 and "alarm" button 115 and a "done" button 111a that, when clicked on by the user, causes image 160 to be erased from the display. Workstation 24 interprets the data in the messages sent by vital signs monitor PCD 16 and displays it as one or more virtual images of waveforms 190a–190c and multiple numeric readings 192 in the same format as on the front panel of the PCD. For example, waveforms 190a–190c represent respectively Mr. Smith's ECG III wave, arterial (ART) blood pressure wave, and pulse oximetry ($SAO_2$) wave.

The footer of a virtual image may also include space (not shown) for short messages. For example, a message on the virtual image of a vital signs monitor may read "rhythm=atrial fib.", and the message for an infusion pump may say "fluid=dextrose 5% water".

Numeric readings 192 permit the user to rapidly determine a complete set of patient vital signs. For example, Mr. Smith's heart rate is 110, his blood pressure as measured invasively (i.e., via a transducer located in an arterial catheter) is 122/58, and as measured by a blood pressure cuff is 123/60. His temperature (T1) is 101.4° F. The displayed data are refreshed with each message received by workstation 24 from the PCD, and messages are transmitted at a rate that allows waveforms 190a–190c to be viewed in real time.

The user controls the operation to any PCD 16, 16a displayed in a window 151–159 by clicking on a selected button of that PCD's image. For example, vital signs monitor image 160 includes a menu 194 of control function entries 196 (i.e., "sensor", "alarms", "display", "system", and "freeze") that the user can operate via the operator interface of workstation 24 as if the user were selecting the same controls on the PCD's front panel. Clicking on any of entries 196 causes either a submenu (not shown) of additional choices for that entry to appear, or causes a window to be displayed that enables the user to manipulate the control function of that entry.

Records of the data received from the various PCDs 16, 16a on network 10 (e.g., snapshots of waveforms 190a–190c and trend data) are stored in the workstation's disk drive 58 and database 36 for later retrieval. Hard copies of data such as waveforms are obtained with a stripchart recorder (not shown). Other devices such as graphical printers (not shown) enable the user to provide documentation of screen displays and generate reports, such as trend plots of several of a patient's vital signs over time.

Referring to FIG. 6, the user can generate an overall view of the arrangement of PCDs connected to any patient (for example, one or more PCDs 16 connected to network 10 at any bedside on the floor) by entering the bedside display mode 200 and clicking on the icon 102 that represents the location of interest. As with displays 100 and 150, bedside display 200 has a header that includes icons to enable the user to switch to the waveform mode 110') or to the map mode (112'), or to silence alarm tones (114). The current message displayed by annunciators 30 is shown in area 109. A window 202 shows a small scale version of floor plan 101 and its colored icons 102. Path line 107 is drawn between nurses' station 26 and the room in which the selected bed (e.g., bed 1101A) is located.

A window 204 to the right of floor plan window 202 contains a set of enlarged icons that identify the type of each PCD connected to network 10 and the status of each PCD below the bed number (or an identification of the cell location) and the patient's name. For example, the presence of vital signs icon 206, ventilator icon 208, and infusion pump icon 210 indicates that John Smith is connected to all three types of PCDs. Each icon 206, 208, 210 is a square that includes a character that identifies the PCD. The color of the square indicates the status of the PCD (e.g., green for satisfactory, red for alarm, and yellow for a suspended alarm or for a bedside for which information is needed).

The icon characters visibly indicate the operation of the PCD. For example, heart symbol 212 flashes with each ECG "R" wave detected by a vital signs monitor. Fluid 214 empties from a concertina bellows 216 with each mechanical breath of a ventilator. A symbol of an IV bottle 218 flashes to indicate the delivery rate of an infusion pump.

Display 200 contains seven other windows 221-227 for the display of virtual images 160, 170, 180 of up to seven PCDs that are in use by the patient and connected to the network. For example, the virtual images of the ventilator, vital signs monitor, and infusion pump being used by Mr. Smith are displayed in windows 221, 224, and 226, respectively. The user interacts with virtual images 160, 170, 180 in the same manner as described above to monitor and control the operation of the PCDs.

Figure 10:
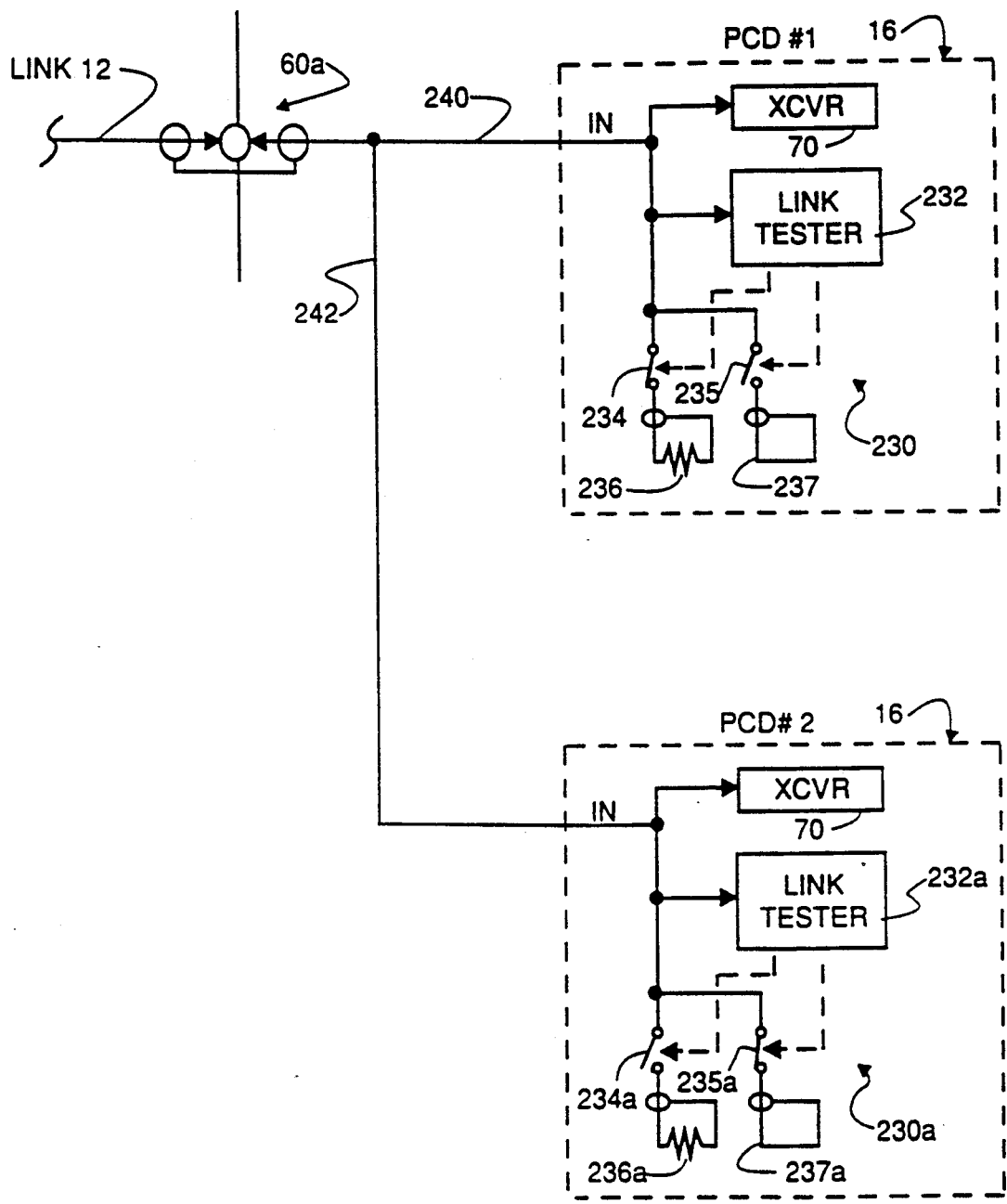
FIG. 10 illustrates terminating the network links according to one embodiment of the invention.

Referring to FIGS. 1 and 10, one way of providing the terminations 18 for each network link 12 that is available in a room 15 is to include circuitry 230 in each PCD 16 that internally terminates link 12. Terminating circuitry 230 includes a link tester 232 for determining whether link 12 is already terminated (e.g., by another PCD 16 already connected to wall jack terminal 60a). This is done, for example, by testing the characteristics of link 12 by time domain reflectometry (TDR) techniques or simply by testing the DC resistance of link 12 (such as between the center conductor and shield if link 12 is a coaxial cable). If link tester 232 determines that link 12 is unterminated, it closes switch 234 to insert terminating resistor 236 between the center conductor and shield.

When an additional PCD 16 (such as PCD #2 in FIG. 10) is connected to already-terminated link 12, the link tester 232a in the newly-added PCD determines whether link 12 is properly terminated given the lengths of the respective cables 240, 242 connected to PCD #1 and PCD #2. For best results, the termination should be at the most distant point on the link. Thus, when link tester 232a determines that link 12 is already terminated, it attempts to transmit over link 12. If it observes a so-called "collision" of the message caused by reflections on link 12 that are the result of an improperly located terminator, link tester 232a closes switch 235a to place an impedance imbalance on link 12 (by short circuiting the center conductor to the shield).

Link tester 232 in PCD #1 detects the imbalance by sensing collisions of messages that it attempts to transmit over link 12, and responds by opening switch 234. The resultant change in the link impedance is sensed by link tester 232a, which then closes 234a and opens switch 235a. This places termination 236a properly at the most distant point of link 12.

Link testers 232 and 232a store the related times at and sequences in which switches 234, 235, 234a, 235a are closed. Link testers 232, 232a construct decision arrays that determine their next activity when an impedance imbalance is sensed. For example, when a third PCD 16 is added an impedance imbalance is observed by testers 232 and 232a. Because link tester 232 has just recently sensed an impedance imbalance (i.e., when PCD #2 was added), it does not immediately react by closing switch 235. Link tester 232a does not have the benefit of this history, so it immediately closes switch 235a in the manner discussed above. If the imbalance is the result of a PCD being removed from link 12, pseudorandomly-chosen time-outs preprogrammed into link testers 232 and 232a cause the remaining devices to seek the proper termination point using the sequence discussed above.

Other Embodiments

Figures 11, 12:
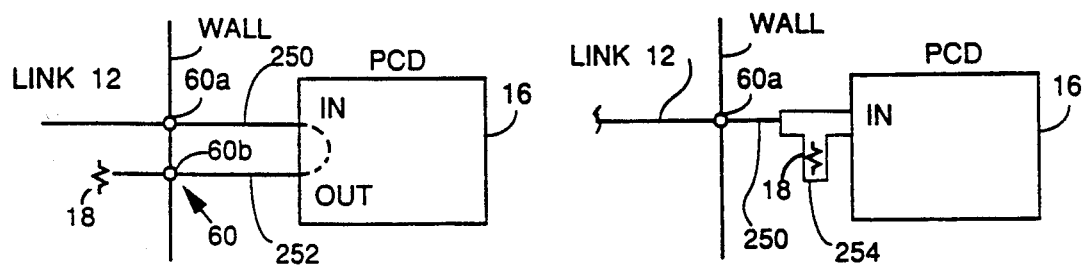
FIGS. 11 and 12 show alternative termination techniques.

Referring to FIGS. 11 and 12, link terminations 18 may alternatively be made by any suitable technique. In the arrangement shown in FIG. 11 a pair of terminals 60a, 60b (e.g., female BNC connectors) are provided at wall jack 60, with terminator 18 being mounted to terminal 60b inside the wall. A cable 250 is connected between terminal 60a (which receives link 12 from the wall) and the network input port of PCD 16. A second cable 252 is then connected between the network output port of monitor 16 and terminal 60b.

FIG. 12 shows yet another alternative technique which requires only one cable 250 and a single wall jack terminal 60a. A "T" connector 254 that contains terminator 18 is inserted between the PCD end of cable 250 and the network input port of PCD 16. Of course, in either of the techniques shown in FIGS. 11 and 12, if the person installing the monitor neglects to make the additional connections necessary to terminate link 12, workstation 24 will not recognize the connection of the PCD to network 10 and will not accept messages from the PCD.

Other transmission media may be used for links 12. For example, each link 12 may be two pairs (send and receive) of twisted pair wires. Termination is provided by the transceivers 70 in the PCDs 16 (FIG. 1). Repeater 14 and workstation 24 detect whether the links are terminated to determine the locations of the PCDs in the same manner as described above.

Annunciators 30 can alternatively be controlled by a dedicated computer connected to a port 13 of repeater 14, rather than by workstation 24. Annunciators 30 can also be connected to a workstation port via a serial (i.e., daisychained) configuration.

Figure 13:
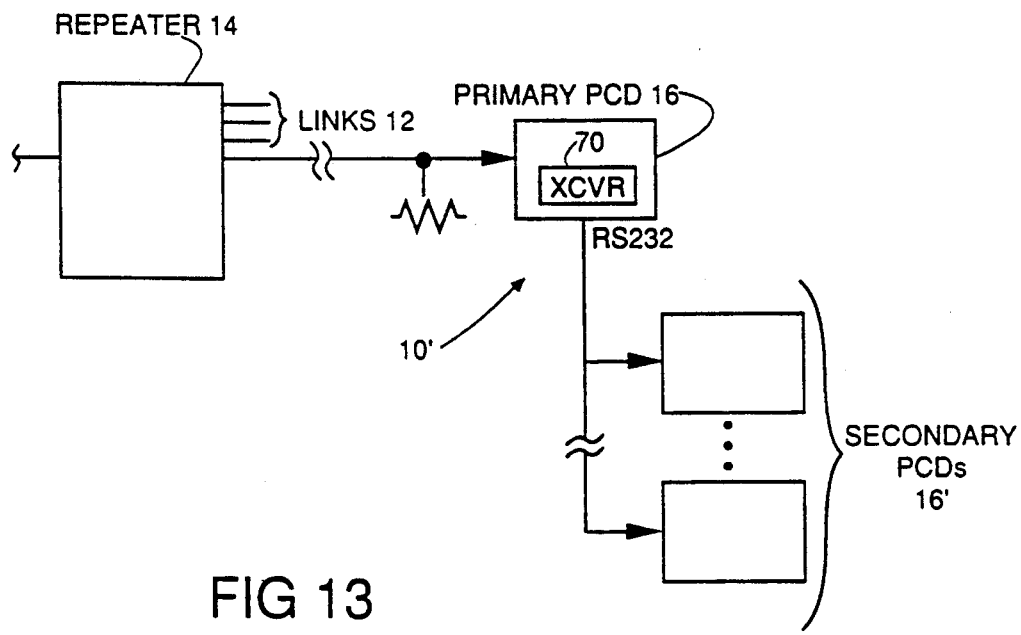
FIG. 13 shows using the network with patient care devices that do not independently send messages over the network.

Referring to FIG. 13, network 10 can also be used with patient care devices that do not themselves have capability of transmitting over network 10. These PCDs (secondary PCDs 16') are connected, for example, to an RS232 port on a primary PCD 16 (i.e., a PCD that includes a network transceiver 70) to form a secondary network 10' at the patient's bedside. Examples of such secondary PCDs are stand-alone pulse oximeters infusion pumps and portable bedside data terminals. The PCDs on secondary network 10' can communicate using any suitable protocol, such as the IEEE P1073 MIB (medical information bus) protocol.

Figure 14:
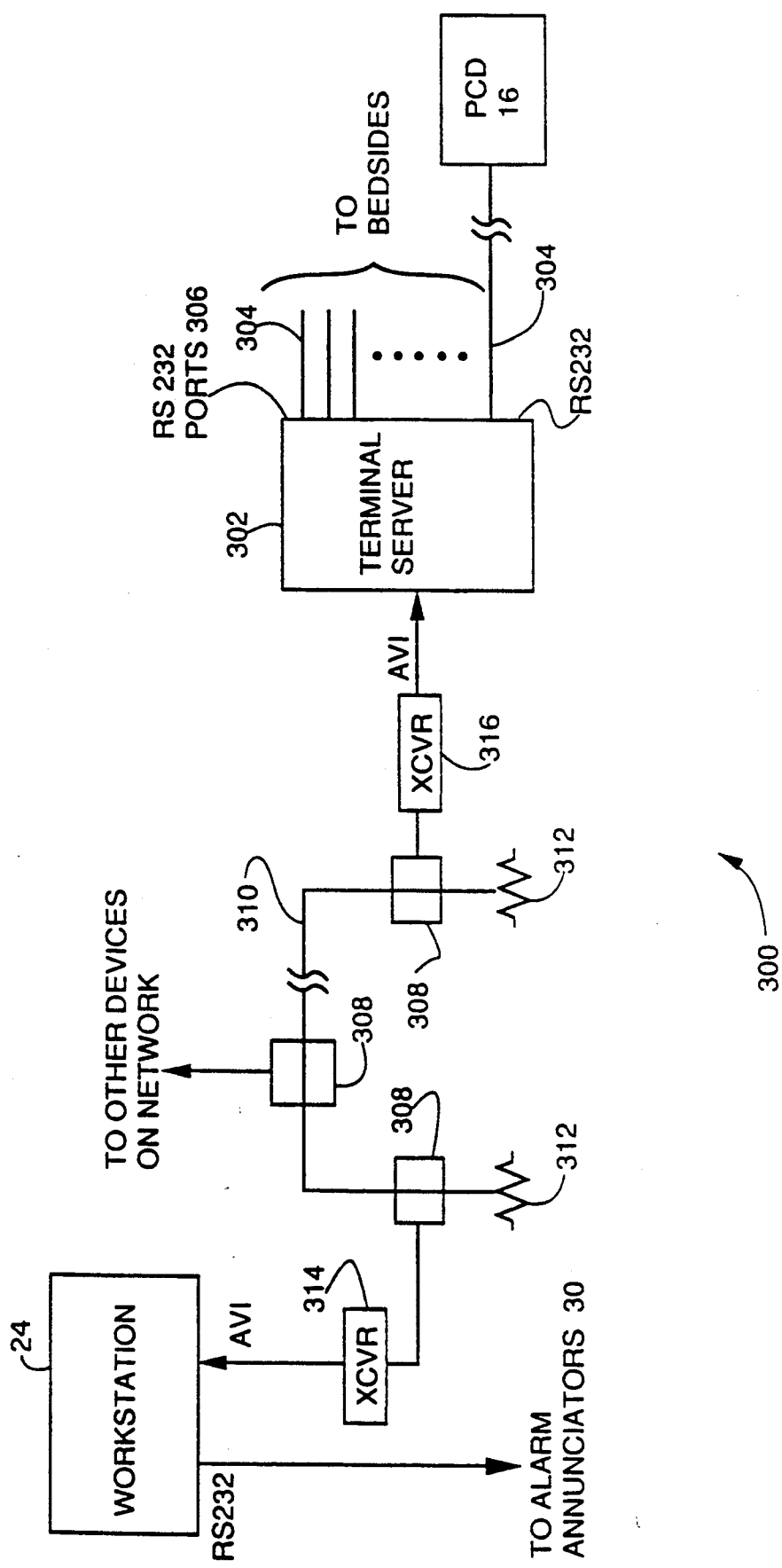
FIG. 14 shows an alternative embodiment of the network.

Referring to FIG. 14, other arrangements of network 10 are also possible. Network 300 employs a terminal server 302 to provide point to point wiring to multiple bedsides via links 304 that extend from RS232 ports 306 of the server. Terminal server 302 is connected to workstation 24 via taps 308 on a single Ethernet cable 310, terminated 312 at each end. Taps 308 are also used to connect other devices on network 300 to cable 310. Network transceivers 314, 316 are interposed between taps 308 and the AUI ports of workstation 24 and terminal server 302, respectively.

In operation, workstation periodically polls each terminal server port 306 to determine which links 304 are connected to a PCD 16. Links 304 that are not so connected are designated inactive, as described above. Only messages present on a link 304 determined to be connected to a PCD 16 are recognized by workstation 24.

Figure 15:
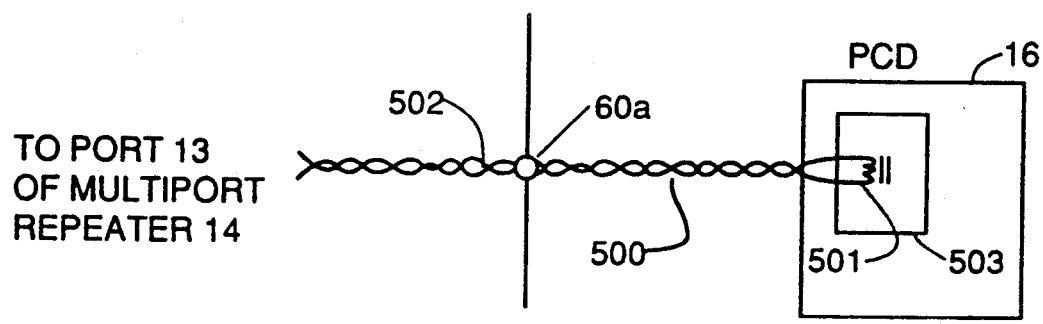
FIG. 15 shows a patient care device connected to a twisted pair link of the network.

FIG. 15 shows a twisted pair (10-base-T) cable 502 used in place of coaxial cable for a link 12. Twisted pair 502 is connected (point-to-point from repeater 14) to wall jack terminal 60a. The cable 500 that connects PCD 16 to terminal 60a is terminated in isolation transformer 501 in the transceiver 503 of the PCD. This connection inherently terminates link 12. Repeater 14 (FIG. 1) detects the termination by sensing a balanced impedance on twisted pair cable 502 and responds by designating link 12 as active. Disconnection of cable 500 from PCD 16 or wall jack terminal 60a produces an impedance imbalance on twisted pair cable 502, which causes multiport repeater to designate link 12 as unterminated and thus unused.

Other embodiments are within the scope of the following claims.

We claim:

1. A system for managing multiple devices each of which selectively operates in one of a normal condition and an alarm condition, each one of said devices being portable to allow the device to be operated in any selected one of a plurality of locations, comprising
   a network that includes a plurality of links each of which is assigned to a predetermined one of said locations, each link having a first state in which none of said devices is in electrical communication with said link and a second state in which at least one of said devices is in electrical communication with said link,
   means for placing at least one of said devices in electrical communication with a selected one of said links that was previously not in electrical communication with any of said devices and changing said selected link from said first state to said second state independently of whether said at least one of said devices that is placed in electrical communication with said one link is in said normal condition or said alarm condition, and
   means for identifying the links that are in electrical communication with said devices by detecting the links that are in said second state independently of identities of the devices that are in electrical communication with said links, and determining the locations at which devices are in electrical communication with said links based on said identifying.

2. The system of claim 1 wherein said devices send and receive messages to other devices on the network via said links, said means for identifying includes circuitry having a plurality of ports, each of which is associated with at least one of said links, for identifying the ports that are associated with links on which said messages appear and determining the locations of said devices based at least in part on the identification of said ports.

3. The system of claim 2 wherein the messages sent by a said device identify said device, said means for identifying associating the identity of said device with the location of said device.

4. The system of claim 3 wherein at least one of said links includes a cable having an end disposed at one of said locations, said end of said cable being unterminated when said link is in said first state,
   said means for causing including means for terminating said end of said cable to change said link to said second state, and
   said means for identifying including circuitry for detecting that said end of said cable has been terminated as a basis for determining that said link is being used.

5. The system of claim 1 wherein at least one of said links communicates over a wireless transmission medium with a said device disposed in a predetermined area, said link including circuitry for designating a location of said device within said area, said means for identifying determining said location based at least in part on said designation.

6. The system of claim 5 wherein said at least one link includes a plurality of transceivers each of which communicates with a device located in a regional cell within said area, said means for identifying determining the location of said device based at least in part on the identity of the transceiver that is communicating with said device.

7. The system of claim 6 wherein said devices each communicate by sending messages that identify said device, and each transceiver includes circuitry for relaying messages received from a said device located in said transceiver's cell and for identifying itself to said means for identifying as part of said relaying.

8. The system of claim 7 wherein said means for identifying includes means for determining the location within said area of a said device said based at least in part on the identification of said transceiver that relays messages from said device.

9. The system of claim 8 wherein said means for identifying includes circuitry having a plurality of ports, each of which is associated with at least one of said links, said plurality of transceivers communicating with at least one of said ports, said circuitry identifying the ports that are associated with links on which said messages appear and determining the locations of said devices based at least in part on the identification of said ports.

10. The system of claim 8 wherein the messages sent by a said device identify said device, said means for identifying associating the identity of said device with the location of said device.

11. The system of claim 3 or 10 wherein said means for identifying includes means for tracking, based on said messages, the identity of each device connected to the network at each location.

12. The system of claim 11 wherein said devices include a plurality of categories of devices, and further comprising a database for storing information that designates, for each device, the category thereof, and said means for identifying including means for accessing said database to enable said means for identifying to determine the category of each one of said devices.

13. The system of claim 2 or 9 wherein said circuitry comprises a unit for retransmitting messages received from a link to which one of said ports is assigned to the links to which other ones of said ports are assigned.

14. The system of claim 13 wherein said unit ignores signals received at ports assigned to unused links and refrains from retransmitting signals to unused links.

15. The system of claim 13 wherein said unit is a multiport repeater.

16. The system of claim 13 wherein said unit is a terminal server.

17. The system of claim 1 wherein said means for identifying includes a processor for communicating with said devices via said links.

18. The system of claim 17 wherein said processor is disposed remotely from at least some of said locations and connected to one of said links.

19. The system of claim 18 wherein said processor includes means for receiving messages sent by said devices on said links, and a display device for displaying to a user information about said devices based on said data.

20. The system of claim 19 wherein said displayed information includes location information that identifies only those locations at which devices are in use on the network.

21. The system of claim 20 wherein each one of said devices communicates information about the status of said device to said processor via its link, said displayed information including status information that indicates said status.

22. The system of claim 21 wherein said displayed information comprises a plurality of symbols each of which has an appearance on said display that is selected to indicate said location information and said status information to the user.

23. The system of claim 21 wherein at least some of said devices receive input signals from an external source and determine whether said input signals are within a predetermined limit, said status information indicating whether said signals are within said predetermined limit.

24. The system of claim 19 wherein at least some of said devices receive input signals from an external source and include a display for displaying data representative of said input signals, said processor including means for causing said display device to display an image that represents said device display.

25. The system of claim 24 wherein at least some of said devices further include at least one control adapted to be manipulated by a user to control the operation of said device, said processor causing said display device to include a symbol in said image that represents said device control.

26. The system of claim 25 wherein said processor includes at least one interface device that is operated by the user to emulate the manipulation of said device control, said processor sending commands to said device via said network that cause the operation of said device to be controlled.

27. The system of claim 19 wherein said processor includes means for generating a plurality of formats for displaying said information about said connected devices and responding to commands entered by a user to selectively display one of said formats.

28. The system of claim 27 wherein at least some of said locations are sites on the floor of a building, one of said formats including a map of said floor, said display device including means for generating, at positions on said map that represent said sites, symbols that identify the sites at which devices have been connected to said links.

29. The system of claim 28 wherein at least some of said devices receive input signals from an external source and include a display for displaying data representative of said input signals and at least one control that a user manipulates to control the operation of said device, said format including a window for displaying an image that represents said device display, said image including a symbol that represents said control.

30. The system of claim 29 wherein said processor includes an interface device responsive to commands entered by the user to enable the user to identify the device for which said image is to be displayed.

31. The system of claim 30 wherein said interface device includes means for allowing said user to identify said device by selecting one of said symbols on said map.

32. The system of claim 17 wherein at least some of said devices receive input signals from an external source, determine whether said input signals are within predetermined limits, and send messages about said input signals to said processor via said links, said system further comprising at least one alarm device responsive to said processor for producing an alarm when a message received by said processor from at least one of said devices indicates that said input signals are not within said predetermined limits.

33. The system of claim 32 wherein said alarm device includes a display for identifying the location of said at least one device.

34. The system of claim 33 wherein said alarm device includes means for generating an audio signal during said alarm.

35. The system of claim 34 wherein said processor includes an interface device responsive to a command entered by the user for causing said alarm device to terminate said audio signal during said alarm.

36. The system of claim 35 wherein at least some of said locations are sites on the floor of a building, said processor including a display device for displaying a map of said floor and producing, at a positions on said map that represent said sites, symbols that identify the sites at which devices are using said links, said display device including means for indicating that said audio signal has been terminated by altering the appearance of the symbol that corresponds to said at least one device.

37. The system of claim 36 wherein said display device displays a symbol that represents said audio alarm signal, said interface device includes means for enabling the user to select said symbol to cause said alarm to be terminated.

38. The system of claim 1 wherein at least one of said links includes a cable having an end disposed at one of said locations, said end of said cable being unterminated when said link is in said first state, said means for causing including means for connecting at least one of said devices to said end of said cable and terminating said cable to change said link to said second state, and said means for identifying including circuitry for detecting that said end of said cable has been terminated as a basis for determining that said link is being used.

39. The system of claim 38 wherein said means for connecting includes circuitry associated with said at least one device for determining if said link has already been changed to said second state by another one of said devices that was previously connected to said end of said cable at said location and that terminated said cable, and circuitry for terminating said end of said cable unless said cable has already been changed to said second state.

40. The system of claim 39 wherein said determining circuitry includes circuitry for testing the impedance of the cable.

41. The system of claim 40 wherein said determining circuitry further comprises circuitry, responsive to a determination that said end of said cable is already terminated by said another one of said devices at said location, for placing an impedance imbalance on said cable if the termination is improper for said at least one device, said impedance imbalance causing said another one of said device to remove the termination, and circuitry for detecting the removal of the termination and causing said circuitry for terminating to terminate said cable.

42. The system of claim 38 wherein said means for connecting includes a terminator that is manually connected to said cable and to said device.

43. The system of claim 1 wherein at least one of said links comprises coaxial cable.

44. The system of claim 1 wherein at least one of said links comprises twisted pair cable.

45. The system of claim 1 wherein said network is an Ethernet network.

46. A method for managing multiple devices each of which selectively operates in one of a normal condition and an alarm condition, each one of said devices being portable to allow the device to be operated in any selected one of a plurality of locations, comprising providing a network that includes a plurality of links each of which is assigned to a predetermined one of said locations, each link having a first state in which none of said devices is in electrical communication with said link and a second state in which at least one of said devices is in electrical communication with said link, placing at least one of said devices in electrical communication with a selected one of said links that was previously not in electrical communication with any of said devices and changing said selected link from said first state to said second state independently of whether said at least one of said devices that is placed in electrical communication with said one link is in said normal condition or said alarm condition, and identifying the link that are in electrical communication with said devices by detecting the links that are in said second state independently of identities of the devices that are in electrical communication with said links, and determining the locations at which devices are in electrical communication with said links based on said identifying.

47. The method of claim 46 wherein at least one of said links includes a cable having an end disposed at one of said locations, said step of causing at least one of said devices to use a selected one of said links including terminating said end of said cable to change said link to said second state, and said identifying including detecting that said end of said cable has been terminated as a basis for determining that said link is being used.

48. The method of claim 47 wherein said step of connecting includes using circuitry associated with said one device to determine if said link has already been changed to said second state by another one of said devices that was previously connected to said end of said cable at said location and that terminates said cable, and terminating said end of said cable unless said cable has already been changed to said second state.

49. The method of claim 48 wherein said determining includes testing the impedance of the cable.

50. The method of claim 48 wherein said determining further comprises responding to a determination that said end of said cable is already terminated by said another one of said devices at said location by placing an impedance imbalance on said cable if the termination is improper for said one device, said impedance imbalance causing said another one of said devices to remove the termination, and detecting the removal of the termination and causing said circuitry for terminating to terminate said cable.

51. The method of claim 47 wherein said step of connecting includes connecting a terminator to said cable and to said device.

52. A controller for managing multiple devices on a network that includes a plurality of links, each one of said devices selectively operating in one of a normal condition and an alarm condition and being portable to allow the device to be operated in any selected one of a plurality of locations, each of said links being assigned to a predetermined one of said locations and having a first state in which none of said devices is in electrical communication with said link and a second state in which at least one of said devices is in electrical communication with said link, said controller comprising means for identifying the links that are in electrical communication with said devices independently of whether said devices are in said normal condition or said alarm condition, by detecting the links that are in said second state independently of identities of the devices that are in electrical communication with said links, and means for determining the locations at which devices are in electrical communication with said links based on said identifying.

* * * * *